US012561588B2

(12) United States Patent
Janik et al.

(10) Patent No.: US 12,561,588 B2
(45) Date of Patent: Feb. 24, 2026

(54) METHODS AND SYSTEMS FOR GENERATING EXAMPLE-BASED EXPLANATIONS OF LINK PREDICTION MODELS IN KNOWLEDGE GRAPHS

(71) Applicant: Accenture Global Solutions Limited, Dublin (IE)

(72) Inventors: Adrianna Janik, Dublin (IE); Luca Costabello, Newbridge (IE); Sumit Pai, Dublin (IE)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 1033 days.

(21) Appl. No.: 17/329,627

(22) Filed: May 25, 2021

(65) Prior Publication Data

US 2022/0383164 A1 Dec. 1, 2022

(51) Int. Cl.
*G06N 5/045* (2023.01)
*G06N 5/02* (2023.01)

(52) U.S. Cl.
CPC .............. *G06N 5/045* (2013.01); *G06N 5/02* (2013.01)

(58) Field of Classification Search
CPC .......... G06N 5/045; G06N 5/02; G06N 5/022; G06F 16/24578
See application file for complete search history.

(56) References Cited

U.S. PATENT DOCUMENTS

| | | | | |
|---|---|---|---|---|
| 2014/0207802 | A1* | 7/2014 | Raghavan | ........... G06F 16/3328 |
| 2014/0297621 | A1* | 10/2014 | Hu | ..................... G06F 17/30424 |
| 2019/0220524 | A1 | 7/2019 | Costabello et al. | |
| 2020/0411191 | A1* | 12/2020 | Balian | ...................... G06N 5/02 |

FOREIGN PATENT DOCUMENTS

| | | | | |
|---|---|---|---|---|
| CN | 108052683 B | * | 1/2018 | ............. G06N 5/022 |
| CN | 112612903 A | * | 12/2020 | ........... G06F 16/367 |

OTHER PUBLICATIONS

Chen, Xiaojun, Shengbin Jia, and Yang Xiang. "A review: Knowledge reasoning over knowledge graph." (Year: 2020).*
Wang, Quan, et al. "Knowledge graph embedding: A survey of approaches and applications." (Year: 2017).*
(Continued)

*Primary Examiner* — Michelle T Bechtold
*Assistant Examiner* — Matiyas T Maru
(74) *Attorney, Agent, or Firm* — Mannava & Kang, P.C.

(57) ABSTRACT

The present disclosure describes methods and systems for generating an explanation for a prediction based on a knowledge graph. The method includes receiving a target triple and a knowledge graph including a set of structured data; converting the knowledge graph to an embeddings space and outputting a plausibility prediction for the target triple; sampling a set of neighbors of elements of the target triple in the embeddings space; obtaining a set of example triples based on the set of neighbors according to the target triple; obtaining a prototype graph based on the set of the example triples according to the target triple; generating an explanation graph based on the prototype graph, the set of example triples, and the target triple; and generating an explanation for the plausibility prediction based on the explanation graph.

17 Claims, 10 Drawing Sheets

(56)          References Cited

OTHER PUBLICATIONS

Lin, Yankai, et al. "Learning entity and relation embeddings for knowledge graph completion." (Year: 2015).*

Faerman et al., "Graph alignment networks with node matching scores." (Year: 2019).*

Qiu, Lin, et al. "Multi-disease predictive analytics: A clinical knowledge-aware approach." (Year: 2021).*

Bean, et al. "Knowledge graph prediction of unknown adverse drug reactions and validation in electronic health records." (Year: 2017).*

Jha, Alokkumar. "Semantic Knowledge Graphs to understand Tumor Evolution and Predict Disease Survival in Cancer." (Year: 2020).*

Chen, et al., "A review: Knowledge reasoning over knowledge graph." (Year: 2020).*

Su, Yu, et al. "Exploiting relevance feedback in knowledge graph search." (Year: 2015).*

Adadi, A. & Berrada, M. Peeking Inside the Black-Box: A Survey on Explainable Artificial Intelligence (XAI). IEEE Access 6, 52138-52160 (2018).

Lawrence, C., Sztyler, T. & Niepert, M. Explaining Neural Matrix Factorization with Gradient Rollback. arXiv:2010.05516 [cs, stat] (2020).

Kang, B., Lijffijt, J. & De Bie, T. ExplaiNE: An Approach for Explaining Network Embedding-based Link Predictions. arXiv:1904. 12694 [cs, stat] (2019).

Yuan, H., Yu, H., Gui, S. & Ji, S. Explainabilityin Graph Neural Networks: A Taxonomic Survey. arXiv:2012.15445 [cs](2020).

Huang, Q. et al. GraphLIME: Local Interpretable Model Explanations for Graph Neural Networks. arXiv:2001.06216 [cs, stat] (2020).

Ying, R., Bourgeois, D., You, J., Zitnik, M. & Leskovec, J. GNNExplainer: Generating Explanations for Graph Neural Networks. Adv Neural Inf Process Syst32, 9240-9251 (2019).

ThorbenFunke, MeghaKhosla, & Avishek Anand. (2021). Hard Masking for Explaining Graph Neural Networks.

Extended European Search Report, EP application No. 22167409.6, mailed on Oct. 10, 2022 , 9 pages.

* cited by examiner

100 receiving, by a reception circuitry, a target triple and a knowledge graph including a set of structured data;                                                      110 converting, by a knowledge graph embedding circuitry, the knowledge graph to an embeddings space and outputting a plausibility prediction for the target triple, wherein the embeddings space includes a set of point coordinates representing the set of structured data in the embeddings space;                                                      120 sampling, by a selection circuitry, a set of neighbors of elements of the target triple in the embeddings space;                                                      130 obtaining, by a filter circuitry, a set of example triples based on the set of neighbors according to the target triple;                                                      140 obtaining, by an aggregation circuitry, a prototype graph based on the set of the example triples according to the target triple;                                                      150 generating, by a synthesis circuitry, an explanation graph based on the prototype graph, the set of example triples, and the target triple;                                                      160 generating, by an output circuitry, an explanation for the plausibility prediction based on the explanation graph.                                                      170

FIG. 1

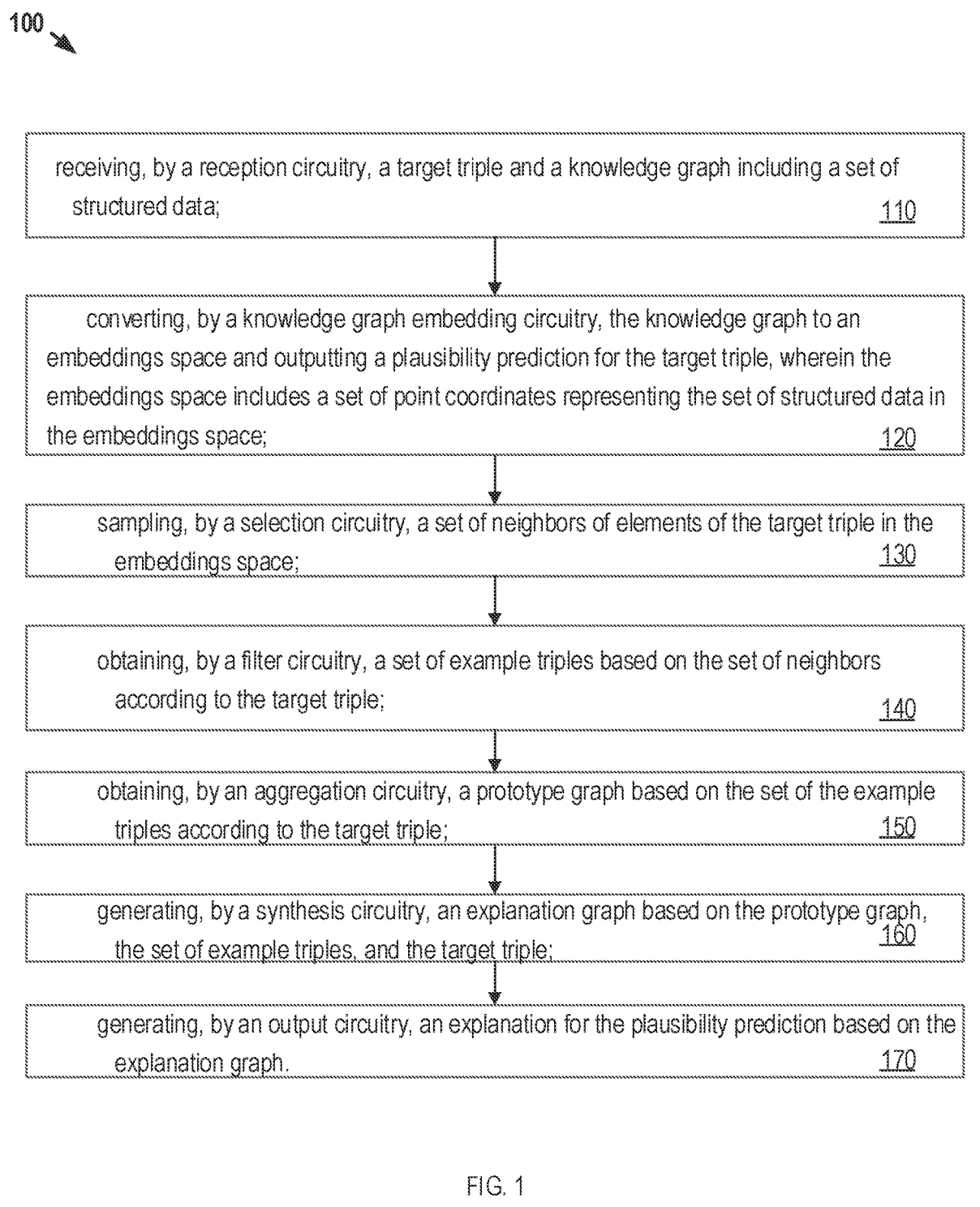

610
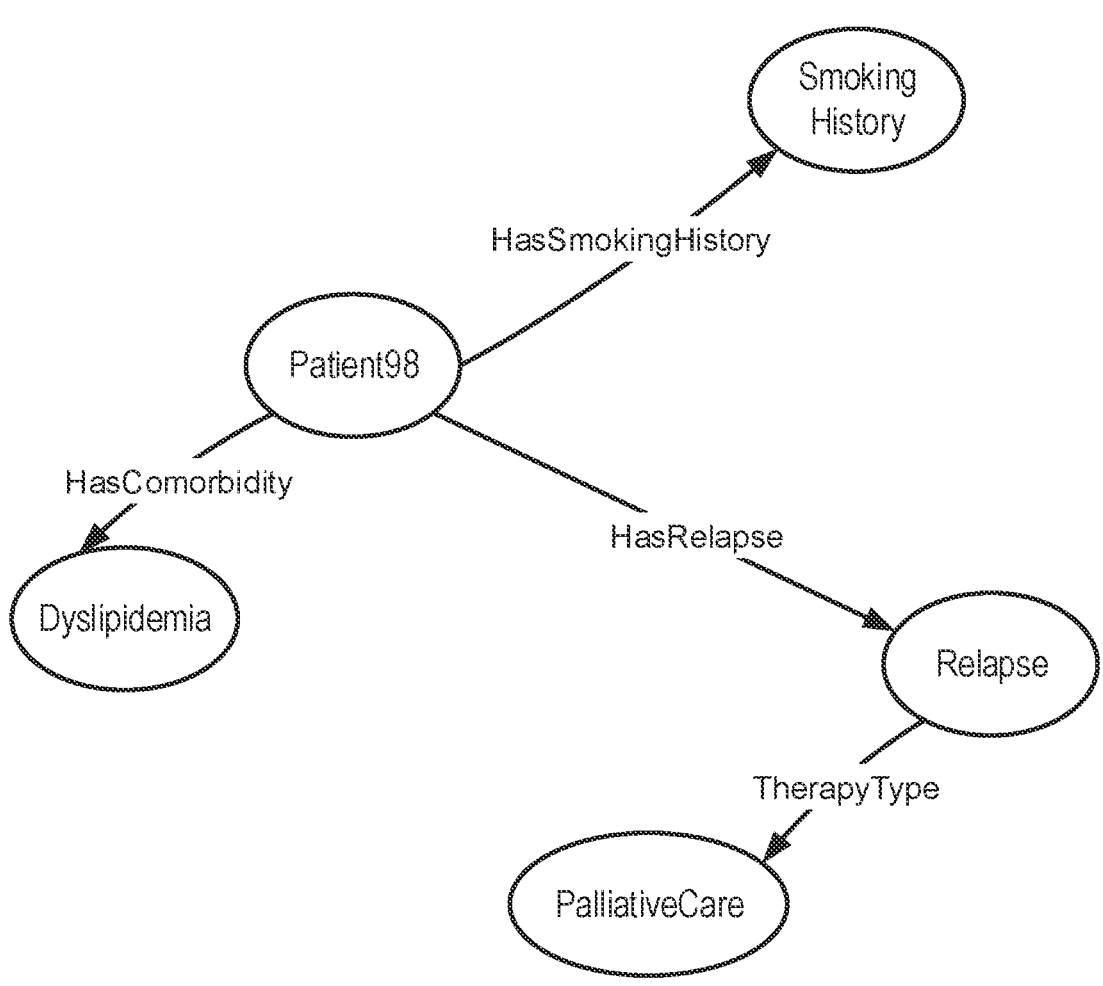
FIG. 6A

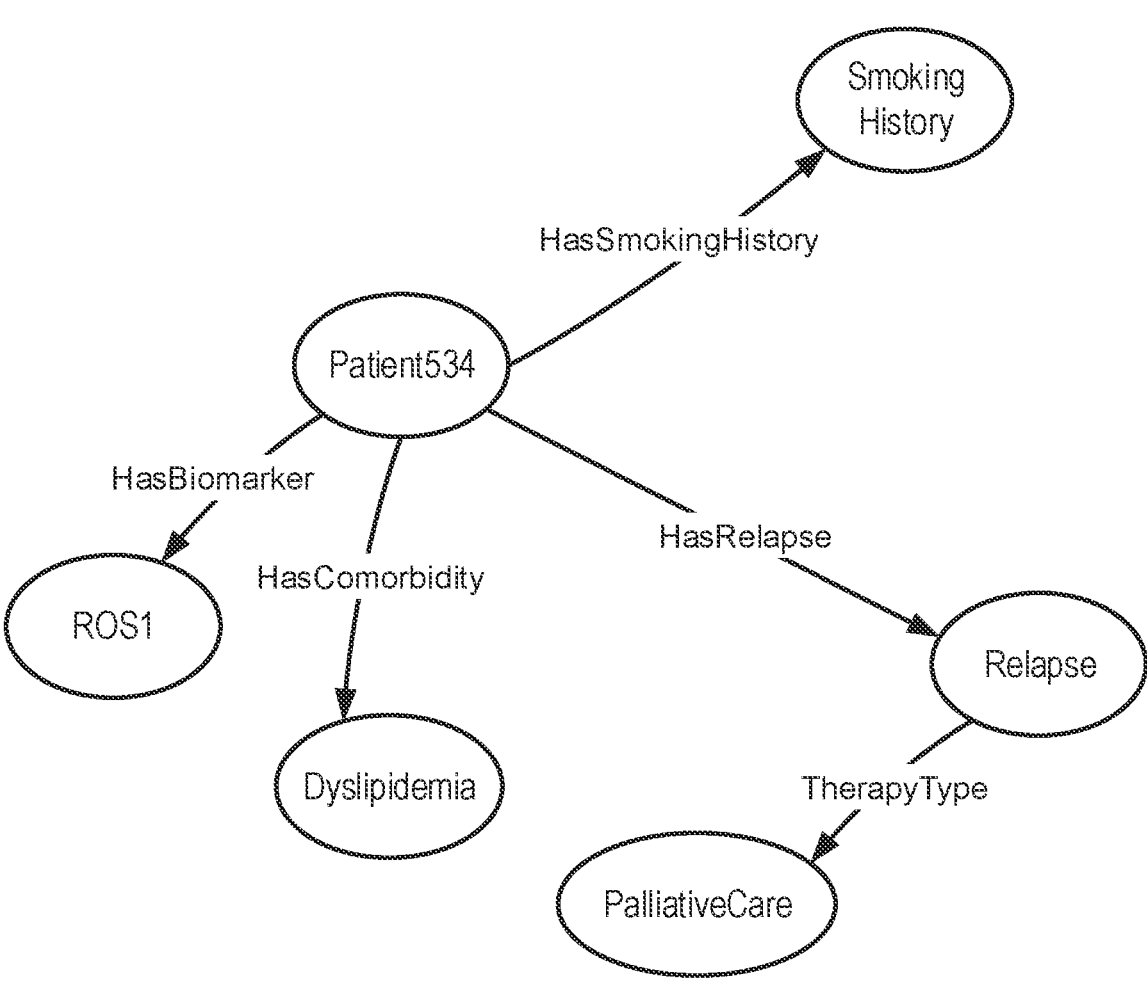
FIG. 6B

630
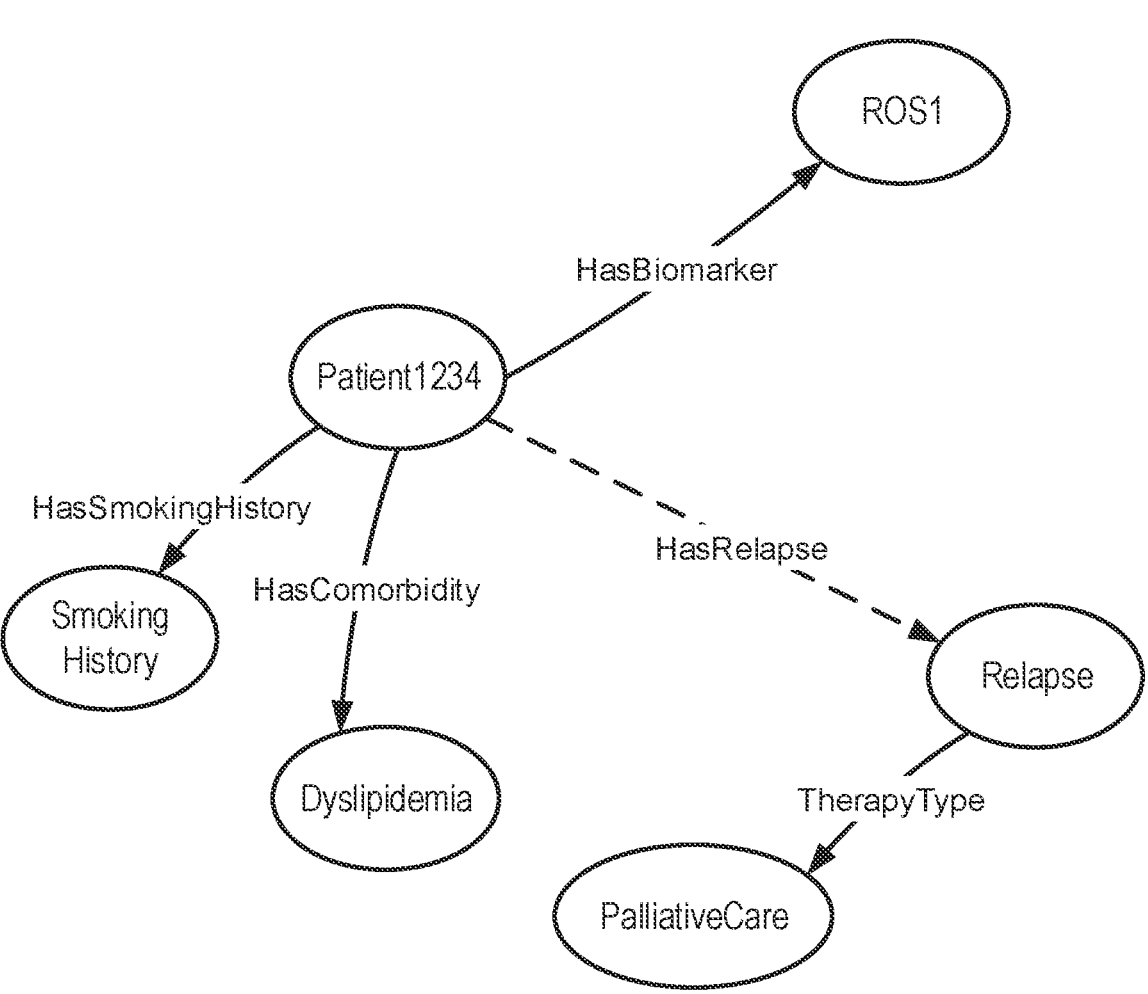
FIG. 6C

METHODS AND SYSTEMS FOR GENERATING EXAMPLE-BASED EXPLANATIONS OF LINK PREDICTION MODELS IN KNOWLEDGE GRAPHS

FIELD OF THE INVENTION

The present disclosure relates in general to the fields of analyzing data elements of a knowledge graph, and predicting new facts from machine learning models applied to the knowledge graph, and in particular to methods and systems for generating concise and scalable explanations for machine learning models that predict missing facts in large knowledge graphs.

BACKGROUND

Data stored in a knowledge graph format is organized to reflect relations between specific concepts within the knowledge graph. Traditional approaches for discovering information from a knowledge graph have not considered solutions for discovering new facts that do not have an existing relationship within the knowledge graph.

Machine learning models may be used to provide a prediction based on an existing knowledge graph. The machine learning process supporting the prediction may be optimized and improved towards a more efficient predicting system.

SUMMARY

The present disclosure describes a computing device for generating an explanation for a prediction based on a knowledge graph. The computing device includes a reception circuitry configured to receive a target triple and a knowledge graph including a set of structured data; a knowledge graph embedding circuitry configured to convert the knowledge graph to an embeddings space and output a plausibility prediction for the target triple, wherein the embeddings space includes a set of point coordinates representing the set of structured data in the embeddings space; a selection circuitry configured to sample a set of neighbors of elements of the target triple in the embeddings space; a filter circuitry configured to obtain a set of example triples based on the set of neighbors according to the target triple; an aggregation circuitry configured to obtain a prototype graph based on the set of the example triples according to the target triple; a synthesis circuitry configured to generate an explanation graph based on the prototype graph, the set of example triples, and the target triple; and an output circuitry configured to generate an explanation for the plausibility prediction based on the explanation graph.

The present disclosure describes a method for generating an explanation for a prediction based on a knowledge graph. The method includes receiving, by a reception circuitry, a target triple and a knowledge graph including a set of structured data; converting, by a knowledge graph embedding circuitry, the knowledge graph to an embeddings space and outputting a plausibility prediction for the target triple, wherein the embeddings space includes a set of point coordinates representing the set of structured data in the embeddings space; sampling, by a selection circuitry, a set of neighbors of elements of the target triple in the embeddings space; obtaining, by a filter circuitry, a set of example triples based on the set of neighbors according to the target triple; obtaining, by an aggregation circuitry, a prototype graph based on the set of the example triples according to the target triple; generating, by a synthesis circuitry, an explanation graph based on the prototype graph, the set of example triples, and the target triple; and generating, by an output circuitry, an explanation for the plausibility prediction based on the explanation graph.

The present disclosure describes a non-transitory computer-readable storage medium storing computer-readable instructions. The computer-readable instructions, when executed by a processor, are configured to cause the processor to perform: receiving a target triple and a knowledge graph including a set of structured data; converting the knowledge graph to an embeddings space and outputting a plausibility prediction for the target triple, wherein the embeddings space includes a set of point coordinates representing the set of structured data in the embeddings space; sampling, a set of neighbors of elements of the target triple in the embeddings space; obtaining a set of example triples based on the set of neighbors according to the target triple; obtaining a prototype graph based on the set of the example triples according to the target triple; generating an explanation graph based on the prototype graph, the set of example triples, and the target triple; and generating an explanation for the plausibility prediction based on the explanation graph.

BRIEF DESCRIPTION OF THE DRAWINGS

The foregoing and other objects, features, and advantages for embodiments of the present disclosure will be apparent from the following more particular description of the embodiments as illustrated in the accompanying drawings, in which reference characters refer to the same parts throughout the various views. The drawings are not necessarily to scale, emphasis instead being placed upon illustrating principles of the present disclosure.

FIG. 1 is a flow diagram illustrating an example of a method implemented by an exemplary system, in accordance with certain embodiments of the present disclosure.

FIG. 6A shows a portion of an example illustrating permissive aggregation strategy with weight calculation in various embodiments.

FIG. 6B shows another portion of an example illustrating permissive aggregation strategy with weight calculation in various embodiments.

FIG. 6C shows another portion of an example illustrating permissive aggregation strategy with weight calculation in various embodiments.

DETAILED DESCRIPTION

Figure 2:
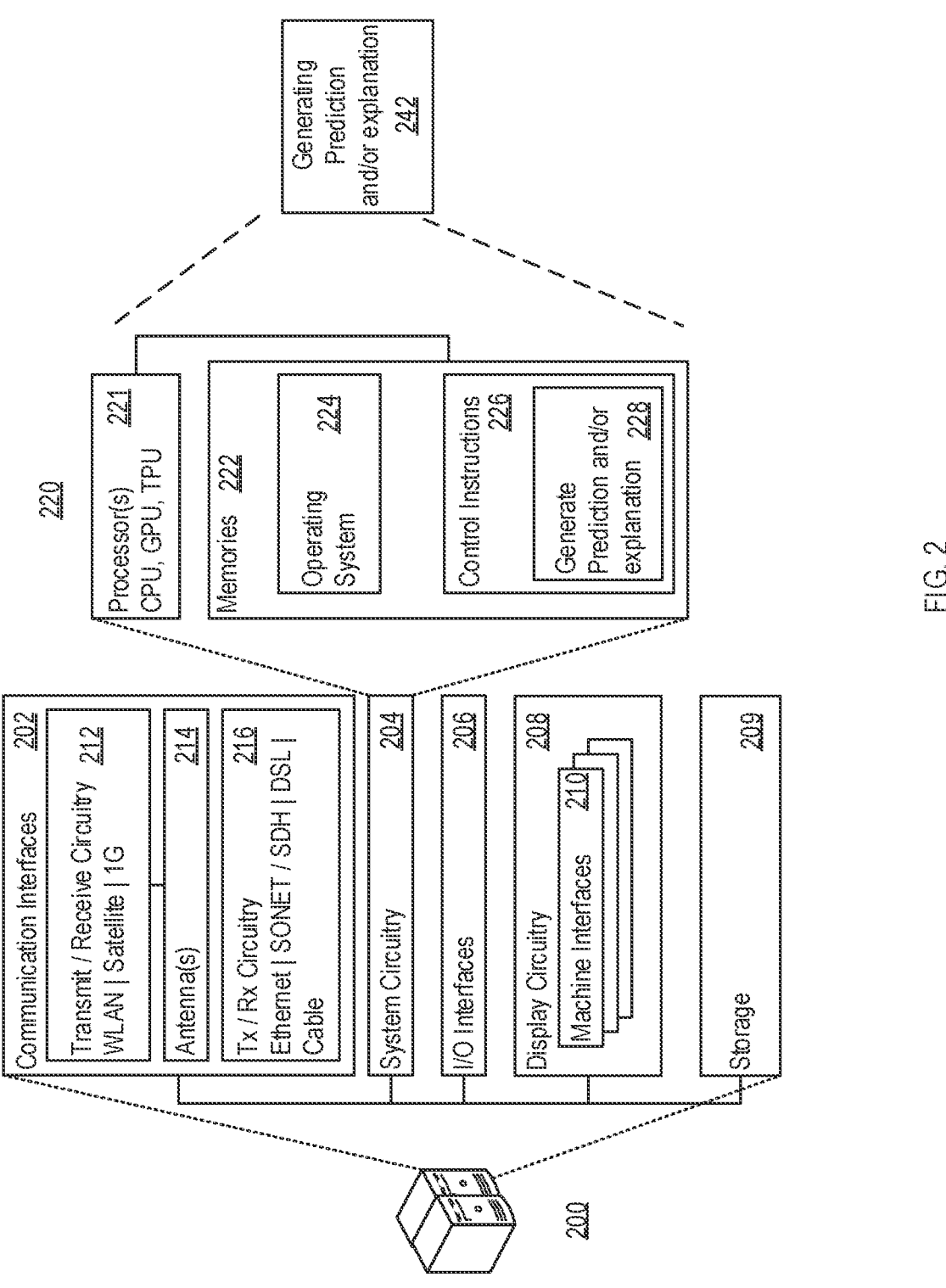
FIG. 2 is a block diagram illustrating an embodiment of a computer architecture for a device for implementing the method in FIG. 1, in accordance with certain embodiments of the present disclosure.

Reference will now be made in detail to the embodiments of the present disclosure, examples of which are illustrated in the accompanying drawings, which form a part of the present disclosure, and which show, by way of illustration, specific examples of embodiments. Please note that the disclosure may, however, be embodied in a variety of different forms and therefore, the covered or claimed subject matter is intended to be construed as not being limited to any of the embodiments to be set forth below. Please also note that the disclosure may be embodied as methods, devices, components, or systems. Accordingly, embodiments of the disclosure may, for example, take the form of hardware, software, application program interface (API), firmware or any combination thereof.

Throughout the specification and claims, terms may have nuanced meanings suggested or implied in context beyond an explicitly stated meaning. Likewise, the phrase "in one embodiment" or "in one implementation" as used herein does not necessarily refer to the same embodiment or implementation and the phrase "in another embodiment" or "in another implementation" as used herein does not necessarily refer to a different embodiment or implementation. It is intended, for example, that claimed subject matter includes combinations of exemplary embodiments or implementations in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" or "at least one" as used herein, depending at least in part upon context, may be used to describe any feature, structure, or characteristic in a singular sense or may be used to describe combinations of features, structures or characteristics in a plural sense. Similarly, terms, such as "a", "an", or "the", again, may be understood to convey a singular usage or to convey a plural usage, depending at least in part upon context. In addition, the term "based on" or "determined by" may be understood as not necessarily intended to convey an exclusive set of factors and may, instead, allow for existence of additional factors not necessarily expressly described, again, depending at least in part on context.

The present disclosure may be embodied in various forms, including a system, a method, a computer readable medium, or a platform-as-a-service (PaaS) product for generating concise and scalable explanations for machine learning models that predict missing facts in large knowledge graphs. In various examples/embodiments, the present disclosure may be applied to provide an explanation to a prediction on whether a cancer patient will relapse.

A knowledge graph may include a set of entities and relations (links) between these entities represented as a graph. A model for a knowledge graph may be defined by a schema or layout that describes the data structures and their relationships, which may be represented by nodes and edges in the knowledge graph. The knowledge graph may present complex and innovative graphical structures that represent the relevant information in response to a query. In various embodiments, the knowledge graph may represent an underlying knowledge base via graphical representations that correspond to structured data points or entities (represented by nodes), relationships (represented by edges), and/or attributes (represented by node properties or edge properties) with semantic meaning.

The knowledge graph may include one or more graph-based datasets. The graph-based datasets may be stored in the memory and includes associations of the corresponding two nodes, for example, a graph-based dataset may include an association of the first node and the second node. In one implementation, a graph-based dataset may include data records having three parameters, which may be known as a triple: a first entity, a relation, and a second entity, and may be represented as <first entity, relation, second entity>. In another implementation, a triple may include a subject, a predicate, and an object. The predicate represents a relationship between the subject and the object. The triple may be represented as <subject, predicate, object>.

For example, a predicate "HasRelapse" may represent an association between a subject representing a "patient" and an object representing a "relapse." For another example, a predicate "therapyType" may represent an association between a subject representing a "relapse" and an object representing a "PalliativeCare." For another example, a predicate "causes" may represent an association between a subject representing a "gene" and an object representing a "disease."

Optionally in some implementations, a graph-based dataset may include data records having an additional fourth parameter, such as a significance/importance parameter. This fourth parameter may be considered an attribute of the predicate parameter. In some implementations, the fourth parameter may comprise metadata.

In various embodiments, machine learning models may be used to predict plausibility of one or more missing link in a knowledge graph. For example, Patient1234 is a cancer patient, and machine learning models may be used to predict whether Patient1234 will relapse. In one implementation, a target triple may be created as <Patient1234, hasRelapse, Relapse>, and a link prediction sub-system may output a prediction on the plausibility of the target triple. For example, a prediction may be 80%, which may mean that there is 80% probability that Patient1234 will relapse.

In some embodiments, a link prediction sub-system may include a system for assessing plausibility of unknown statements, for example, triples, in a knowledge graph. The link prediction sub-system may include an optimized knowledge graph embeddings (KGE), which include an optimized set of vectors representing entities and links of a knowledge graph. The link prediction sub-system may receive a knowledge graph and a target triple as input, and generate a prediction as output.

In some embodiments, a training step may include one or more sub-steps for the link prediction sub-system to train the system, and may take an amount of time as training time. An inference step may include one or more sub-steps for the link prediction sub-system to predict the target triple, and may take another amount of time as inference or production time.

Various embodiments in the present disclosure may provide a concise explanation for the prediction returned by the link prediction sub-system. The concise explanation may provide significant added benefits. For example, one added benefit may include allowing a more informed decision by an end user (e.g., clinician) when an explanation for the prediction is presented along with the prediction. Another added benefit may include, with more trustworthy predictions with explanation are generated, achieving better buy-in from end users. Another added benefit may include satisfying patient's right to explanation for the prediction (e.g., general data protection regulation (GDPR)).

Various embodiments in the present disclosure may generate an explanation for a prediction in a large knowledge graph with reasonable time and certain memory constraints, addressing at least one problems/issues. For example, the problems/issues may include non-applicability to some knowledge graphs and some link prediction tasks; and/or non-scalability to real-world large graphs due to high memory requirement and low speed due to restricted training optimization required.

In various embodiments, approaches to addressing at least one of the problem/issues include a KGE-based explanation sub-system for providing explanations through a novel heuristics based on local and example-based explanations.

In one implementation, the KGE-based explanation sub-system may be dedicated to link predictions and/or dedicated for knowledge graphs.

In another implementation, the KGE-based explanation sub-system may include fewer or no traces from training prediction system. Traces from training prediction system include extra metadata that may be much larger than data itself. With including no traces, the KGE-based explanation sub-system may reduce/save memory usage/requirement.

In another implementation, the KGE-based explanation sub-system may include no restricted training optimization, so as to reduce/save time usage/requirement.

The present disclosure describes various embodiments for a method for generating concise and scalable explanations for machine learning models that predict missing facts in large knowledge graphs.

Referring to FIG. 1, a method 100 may include a portion or all of the following. Step 110: receiving, by a reception circuitry, a target triple and a knowledge graph including a set of structured data. Step 120: converting, by a knowledge graph embedding circuitry, the knowledge graph to an embeddings space and outputting a plausibility prediction for the target triple, wherein the embeddings space includes a set of point coordinates representing the set of structured data in the embeddings space. Step 130: sampling, by a selection circuitry, a set of neighbors of elements of the target triple in the embeddings space. Step 140: obtaining, by a filter circuitry, a set of example triples based on the set of neighbors according to the target triple. Step 150: obtaining, by an aggregation circuitry, a prototype graph based on the set of the example triples according to the target triple. Step 160: generating, by a synthesis circuitry, an explanation graph based on the prototype graph, the set of example triples, and the target triple. And/or step 170: generating, by an output circuitry, an explanation for the plausibility prediction based on the explanation graph.

FIG. 2 shows an example execution circuitry for implementing the method 100. In one implementation, the execution circuitry may include a computer system 200 for implementing the method 100. In another implementation, the execution circuitry may include a distributed system including more than one computer systems each of which may include a portion or all of the components as the computer system 200 in FIG. 2.

Referring to FIG. 2, the execution circuitry 200 may include communication interfaces 202, system circuitry 204, input/output (I/O) interfaces 206, storage 209, and display circuitry 208 that generates machine interfaces 210 locally or for remote display, e.g., in a web browser running on a local or remote machine. The machine interfaces 210 and the I/O interfaces 206 may include GUIs, touch sensitive displays, voice or facial recognition inputs, buttons, switches, speakers and other user interface elements. Additional examples of the I/O interfaces 206 include microphones, video and still image cameras, headset and microphone input/output jacks, Universal Serial Bus (USB) connectors, memory card slots, and other types of inputs. The I/O interfaces 206 may further include magnetic or optical media interfaces (e.g., a CD ROM or DVD drive), serial and parallel bus interfaces, and keyboard and mouse interfaces. The display circuitry 208 may include man-machine interfaces and/or graphical user interfaces (GUI). The GUI may be used to present interfaces and/or options to facilitate model management and/or the execution of other tasks.

The communication interfaces 202 may include wireless transmitters and receivers ("transceivers") 212 and any antennas 214 used by the transmitting and receiving circuitry of the transceivers 212. The transceivers 212 and antennas 214 may support Wi-Fi network communications, for instance, under any version of IEEE 802.11, e.g., 802.11n or 802.11ac. The communication interfaces 202 may also include wireline transceivers 216. The wireline transceivers 116 may provide physical layer interfaces for any of a wide range of communication protocols, such as any type of Ethernet, data over cable service interface specification (DOCSIS), digital subscriber line (DSL), Synchronous Optical Network (SONET), or other protocol. Additionally or alternatively, the communication interface 202 may support secure information exchanges, such as secure socket layer (SSL) or public-key encryption-based protocols for sending and receiving private data.

The storage 209 may be used to store various initial, intermediate, or final data or model for implementing the method 100 in FIG. 1. These data corpus may alternatively be stored in a database. In one implementation, the storage 209 of the computer system 200 may be integral with the database. The storage 209 may be centralized or distributed, and may be local or remote to the computer system 200. For example, the storage 209 may be hosted remotely by a cloud computing service provider.

The system circuitry 204 may include hardware, software, firmware, or other circuitry in any combination. The system circuitry 204 may be implemented, for example, with one or more systems on a chip (SoC), application specific integrated circuits (ASIC), microprocessors, discrete analog and digital circuits, and other circuitry.

The system circuitry 204 may support tasks described in the present disclosure, including the drawings and/or claims. In one example, the system circuitry 204 may be implemented as processing circuitry 220 for implementing generating prediction and/or explanation 242, which may provide software support to implement the various tasks performed in the method 100 of FIG. 1. The processing circuitry 220 may include one or more processors 221 and one or more memories 222. The one or more processors 221 may include a portion or all of the following: one or more central processing unit (CPU), one or more graphics processing unit (GPU), and/or one or more tensor processing unit (TPU). The memories 222 stores, for example, control instructions 226 and an operating system 224. The control instructions 226, for example may include instructions for implementing the task of predicting node-to-node links in knowledge graphs 228. In one implementation, the one or more processors 221 execute the control instructions 226 and the operating system 224 to carry out any desired functionality described in the present disclosure. In another implementation, the one or more processors 221 may include a CPU and multiple GPU/TPU to perform one or more steps in method 100.

Referring to FIG. 2, the memories 222 may further include applications and structures, for example, coded objects, templates, or one or more other data structures to facilitate model management and/or the execution of other tasks.

Figure 3A:
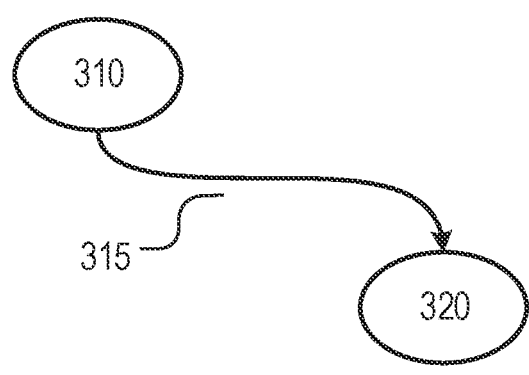
FIG. 3A is a schematic diagram illustrating a knowledge graph schema, in accordance with certain embodiments of the present disclosure.

Referring to FIG. 3A, an example of a knowledge graph may include a first node 310, a second node 320, and a link 315 between the first node 310 and the second node 320. The link 315 may be a predicate. The first and second nodes (310 and 320) may represent associated objects, respectively. The link or predicate may have a directionality pointing from the first object associated with the first node 310 to the second object associated with the second node 320. In one implementation, the nodes may be referred as entities, and/or the link may be referred as relation, predicate, or edge.

Figure 3B:
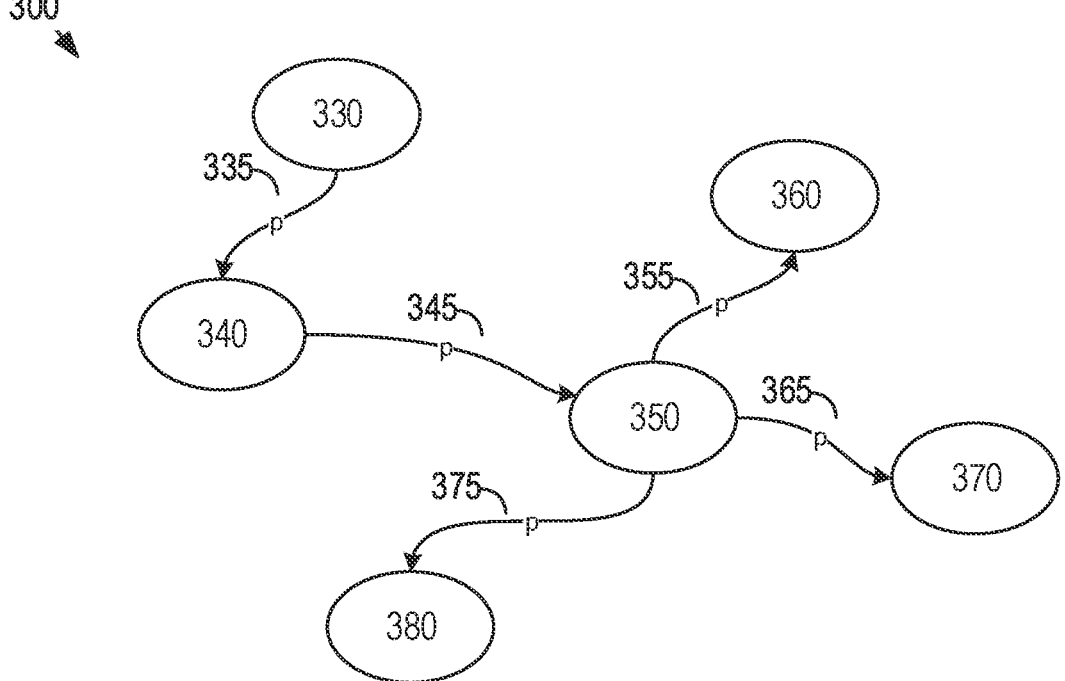
FIG. 3B is a schematic diagram illustrating a knowledge graph schema, in accordance with certain embodiments of the present disclosure.

Referring to FIG. 3B, another example of a knowledge graph 300 may include a plurality of nodes (330, 340, 350, 360, 370, and 380) and a plurality of links or predicates (335, 345, 355, 365, and 375) between the plurality of nodes.

Figure 4:
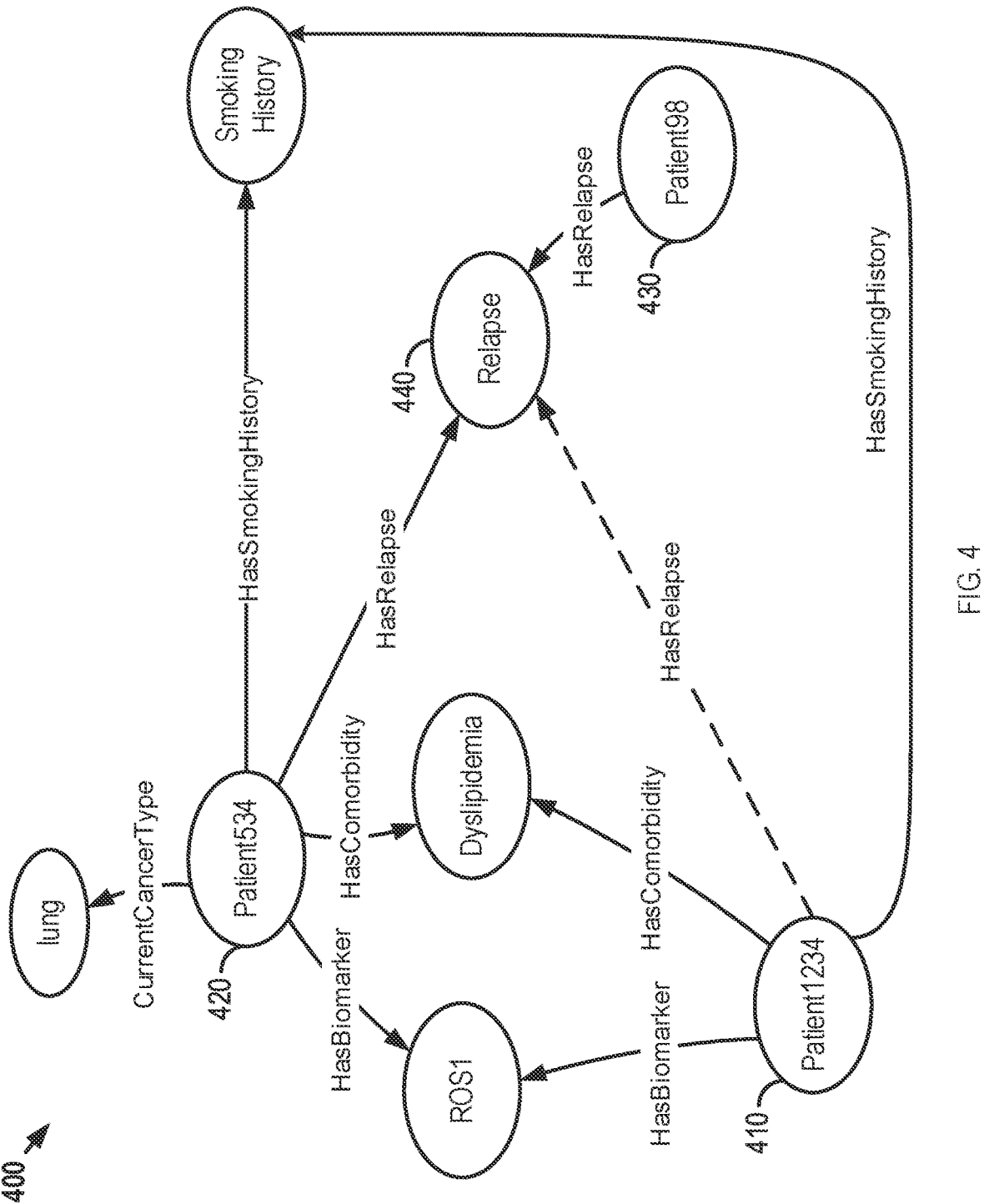
FIG. 4 is an example of a knowledge graph, in accordance with certain embodiments of the present disclosure.

Referring to FIG. 4, in one implementation, a knowledge graph schema 400 is described as an example in accordance with various embodiments of the present disclosure. The schema may provide a manner to express statements about the resources or knowledge base using specific properties that describe the knowledge base. For example, a Resource Description Framework (RDF) may provide a data model that represents the knowledge base in expressions of the form subject-predicate-object. In one implementation, the knowledge base may be expressed by graph-based datasets or triples, which includes one subject, one object, and a link or predicate. The link or predicate may include one or more numerical attributes.

Referring to the knowledge graph 400 in FIG. 4, a node 410 may represent a patient (e.g., Patient1234), who needs a prediction on whether Patient1234's cancer will relapse. A node 420 may represent another patient (e.g., Patient534); and a node 430 may represent another patient (e.g., Patient98). The subject may denote the resource, and the predicate may denote traits or aspects of the resource and express a relationship between the subject and the object. FIG. 4 shows a portion of the knowledge graph including a target triple of <Patient1234, HasRelapse, Relapse>. For example but not limited to, the node 420 (Patient534) has a relationship of "HasRelapse" to a node 440 ("Relapse"), the node 420 (Patient534) has a relationship of "HasSmokingHistory" to a node "SmokingHistory", the node 430 (Patient98) has a relationship of "HasRelapse" to a node 440 ("Relapse"), and the node 410 (Patient1234) has a relationship of "HasSmokingHistory" to a node "SmokingHistory". There may be other portion of the knowledge graph that is not shown in FIG. 4.

Figure 5:
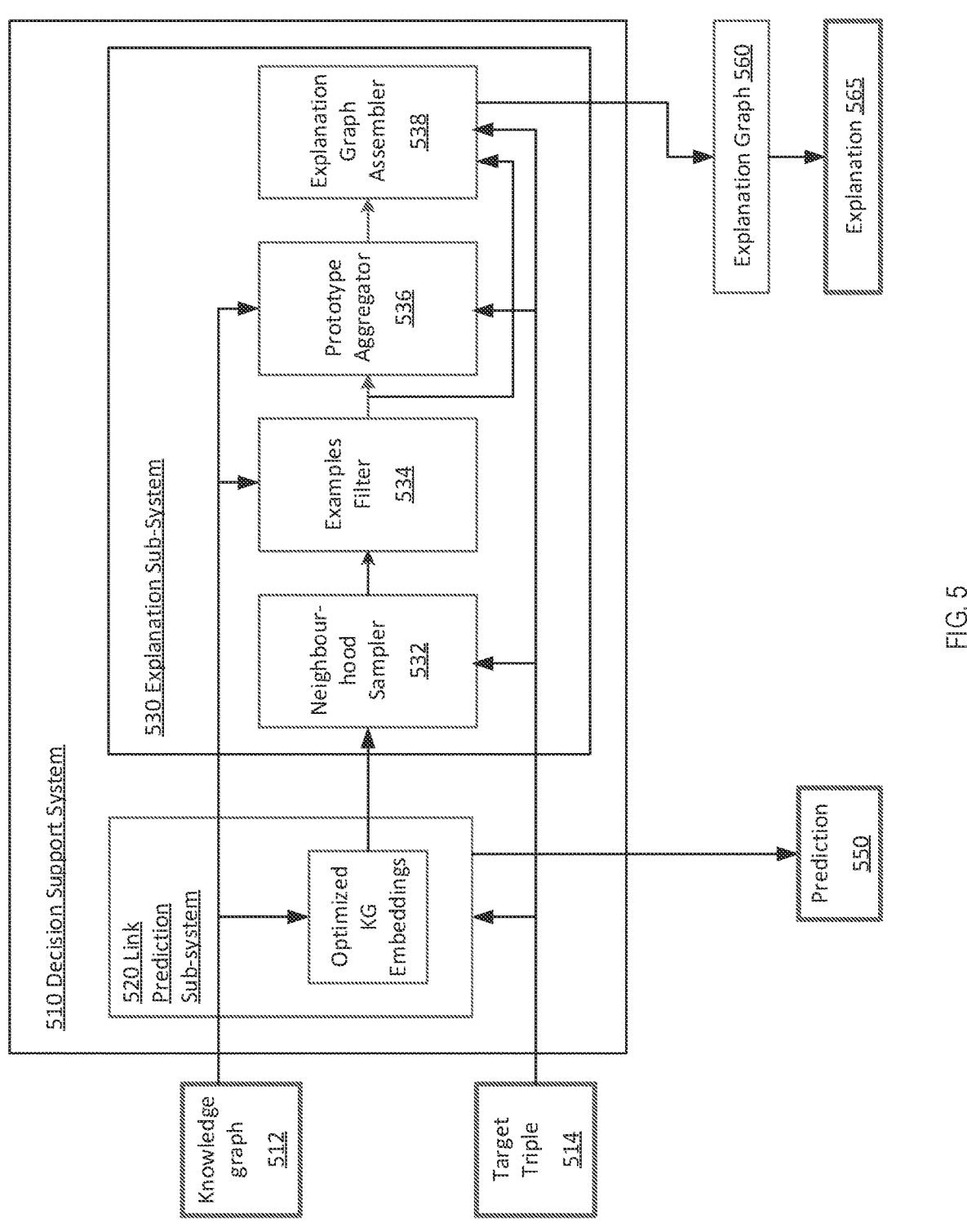
FIG. 5 is a block diagram illustrating an embodiment of a system, in accordance with certain embodiments of the present disclosure.

FIG. 5 shows a schematic diagram for various embodiments in the present disclosure. A decision support system 510 may include a link prediction sub-system 520 and/or an explanation sub-system 530. The system or each sub-system may include corresponding circuitry to perform related functions/steps.

The decision support system 510 may include a first input of a knowledge graph 512 and/or a second input of a target triple 514; and include a first output of a prediction 550, an explanation graph 560, and/or an explanation 565. The prediction 550 includes a plausibility prediction for the target triple; and the explanation graph 560 and the explanation 565 are generated for explaining the prediction 550 for the target triple.

The link prediction sub-system 520 may include an optimized KG embeddings. The explanation sub-system 530 may include a portion or all of the following: a neighborhood sampler 532, an examples filter 534, a prototype aggregator 536, and/or an explanation graph assembler 538.

Referring to step 110 in FIG. 1, the method 100 may include receiving, by a reception circuitry, a target triple and a knowledge graph including a set of structured data. The reception circuitry may include a portion or all of the execution circuitry 200 in FIG. 2, including a memory storing instructions and a processor in communication with the memory. The knowledge graph includes a set of triples including predicates between first nodes and second nodes, and the first and second nodes represent associated objects. The target triple includes a triple to assess for plausibility.

For one example, the knowledge graph may include a portion or all of the knowledge graph 400 in FIG. 4, and/or the target triple may include a triple of <Patient 1234, HasRelapse, Relapse> as shown in dashed line in FIG. 4.

Referring to step 120 in FIG. 1, the method 100 may include converting, by a knowledge graph embedding circuitry, the knowledge graph to an embeddings space and outputting a plausibility prediction for the target triple, wherein the embeddings space includes a set of point coordinates representing the set of structured data in the embeddings space. The knowledge graph embedding circuitry may include a portion or all of the execution circuitry 200 in FIG. 2, including a memory storing instructions and a processor in communication with the memory.

In one implementation, the knowledge graph embedding circuitry may refer to a link prediction sub-system 520 in FIG. 5.

In another implementation, the link prediction sub-system may itself receive a knowledge graph (KG) and a target triple, or may receive the knowledge graph (KG) and the target triple from the reception circuitry.

The link prediction sub-system may include an embedding generation sub-system, which may be a neural network and/or may be referred as a knowledge graph embedding (KGE) model. The embedding generation sub-system may include an optimizer (e.g., stochastic gradient descent or any variant), a scoring function that assigns plausibility score to a fact (e.g., TransE, ComplEx, DistMult scoring functions), and a loss function that is used to have objective being minimized by optimizer during training time (e.g., pairwise margin-based, absolute margin, negative log-likelihood, self-adversarial functions, and etc.).

For each element (node and/or edge) in the knowledge graph and the target triple, the link prediction sub-system may generate k-size embedding's vector that represents each of the nodes and edges of the input training knowledge graph, wherein k is a positive integer. In one implementation, k may be 100. In another implementation, k may be 400.

The optimized KG embeddings, generated by the knowledge graph embedding circuitry, may be vectors in the k-dimensional embeddings space.

The prediction or plausibility prediction, generated by the knowledge graph embedding circuitry, may indicate a probability that the target triplet is a correct relation or statement.

Referring to step 130 in FIG. 1, the method 100 may include sampling, by a selection circuitry, a set of neighbors of elements of the target triple in the embeddings space. The selection circuitry may include a portion or all of the execution circuitry 200 in FIG. 2, including a memory storing instructions and a processor in communication with the memory.

In one implementation, the selection circuitry may refer to a neighborhood sampler 532 in FIG. 5.

The knowledge graph embedding circuitry may receive optimized KG k-dimensional embeddings and a target triple as inputs, and may generate/output a set of neighbors of elements of the target triple. In the embeddings space, one or more vectors is sampled with a chosen similarity function, so that neighbors around elements of the target triple are selected based on at least one conditions. In one implementation, one condition may include a parameter (e.g., similarity threshold), which specifies constraint of a minimum similarity between embeddings to be considered as neighbors.

In one implementation, for each of a set of embeddings, the step 130 may include a portion or all of the following: calculating a similarity value between the embedding and an element of the target triple according to a similarity function; determining whether the similarity value is equal to or larger than a similarity threshold; and in response to determining that the similarity value is equal to or larger than the similarity threshold, determining/sampling the embedding entity as part of the set of neighbors. In another implementation, the similarity function may include, but not limited to, an inverse of a distance measure function. For example, the similarity function may include an inverse of at least one of the following distance measure functions: a cosine function, an Euclidean function, a Jaccard function, or a kernel-based function.

In another implementation, the step 130 may include a maximum number (N) of neighbors, so as to limit the sampled/generated number of neighbors. The maximum number (N) is a positive integer, for example but not limited to, 3, 5, or 10. In one implementation, when more than the maximum number of embedding entities satisfy the similarity threshold, the top N embedding entities are selected/sampled after embedding entities satisfying the similarity threshold are sorted in order of from larger similarity value to smaller similarity value.

In another implementation, the step 130 may reduce the size of graph by applying fast sampling operation.

In another implementation, the step 130 may be performed at the inference time, unlike what is done in some of the previous works, reducing the memory footprint from collecting extra training traces.

For one example when the target triple includes <Patient1234, hasRelapse, Relapse>, the selection circuitry may sample a set of neighbors of elements of the target triple in the embeddings space, and the set of neighbors may include {Patient1234, Patient98, Patient534}, {Progression, CardiacArrest, Relapse}, and etc.

Referring to step 140 in FIG. 1, the method 100 may include obtaining, by a filter circuitry, a set of example triples based on the set of neighbors according to the target triple. The filter circuitry may include a portion or all of the execution circuitry 200 in FIG. 2, including a memory storing instructions and a processor in communication with the memory.

In one implementation, the filter circuitry may refer to an examples filter 534 in FIG. 5.

The filter circuitry may receive a set of neighbors and a knowledge graph as inputs, and generate/output a set of example triples.

In another implementations, the step 140 may include a portion or all of the following: generating a set of example candidates based on the set of neighbors; and selecting the set of example triples from the set of example candidates based on the knowledge graph according to the target triple.

To generate a set of example candidates based on the set of neighbors, Cartesian products of all neighbors of subject of the target triple are generated. For example, Patient1234 is the subject of the target triple, and Patient98 and Patient534 are two (N) neighbors. The Cartesian products include subject with all neighbors of the object of the target triple including object. For example, Relapse is the object of the target triple, and Progression and Cardiac Arrest are two (M) neighbors of the object in the close proximity. Thus, the potential examples candidates may include (M+1)*(N+1)−1 combinations. For the present example, M=2, N=2, so that the potential examples candidates may include 3*3−1=8 combinations, including the following: <Patient98, ?, Relapse>, <Patient534, ?, Relapse>, <Patient98, ?, Progression>, <Patient98, ?, Cardiac Arrest>, <Patient534, ?, Progression>, <Patient534, ?, Cardiac Arrest>, <Patient1234, ?, Progression>, and <Patient1234, ?, Cardiac Arrest>. Here, "?" refers to a link in the candidate triples.

In another implementation, each or none of the three elements of the target triple may be constrained. In the present example, a predicate (or link) is fixed to be of same type as the target triple (HasRelapse). This example is not a limitation to various embodiments in the present disclosure, neighbors of a link may be found in a same or similar manner as for the subject and/or object. In some implementations, the decision of finding neighbors may be dependent on the knowledge graph.

From the set/pool of potential example candidates, the ones that are considered as true may be selected/filtered out to be part of a set of example triples, which may depend on the knowledge graph. In one implementation, in the training knowledge graph, the knowledge graph matches to one or more of the set/pool of potential examples candidates. For example, two triples in the knowledge graph, for example, <Patient98, HasRelapse, Relapse> and <Patient534, HasRelapse, Relapse>, may match the first two triples in the set of potential examples candidates: <Patient98, ?, Relapse> and <Patient534, ?, Relapse>. These two triples also have same predicate as target triple (HasRelapse), so these two triples are selected/filtered out to be part of the set of example triples.

For the present example, the set of example triples may include <Patient98, HasRelapse, Relapse>, <Patient534, HasRelapse, Relapse>, <Patient1234, resembles, Patient534>, <Patient1234, resembles, Patient98>, <Relapse, resembles, Relapse>, and/or <Relapse, resembles, Relapse>.

In another implementation, the step 140 may generate potential examples and filter ones that are likely to be pertinent examples, unlike what is done in some of the previous works that do not provide examples as explanations.

Referring to step 150 in FIG. 1, the method 100 may include obtaining, by an aggregation circuitry, a prototype graph based on the set of the example triples according to the target triple. The aggregation circuitry may include a portion or all of the execution circuitry 200 in FIG. 2, including a memory storing instructions and a processor in communication with the memory.

In one implementation, the aggregation circuitry may refer to a prototype aggregator 536 in FIG. 5.

The aggregation circuitry may receive a set of example triples, a target triple, and a knowledge graph as inputs, and generate/output a prototype graph.

In another implementation, the step 150 may include a portion or all of the following: obtaining the prototype graph based on the set of the example triples according to the target triple and at least one of a permissive aggregation strategy or a strict aggregation strategy, and/or calculating, by the aggregation circuitry, an edge weight for each edge of the prototype graph based on the knowledge graph.

A prototype may be obtained by an aggregation strategy (AS) based on a set of example triples, a hop level, and a target triple. In one implementation, the aggregation strategy (AS) may be expressed as a function of AS (Examples, N, Target Triple), wherein Examples refers to the set of example triples, N being a positive integer refers to the hop level, and Target Triple refers to the target triple. Here, a "hop level" may refer to how many links are needed to pass to reach the neighbor node.

In one implementation, the aggregation strategy may include a permissive aggregation strategy, wherein AS_permissive=

$\cup_i$ N-hood(Example$_i$ N)$\cap$N-hood(Target Triple).

N-hood is a neighborhood function, which returns fragment of the knowledge graph with requested triple neighbors (predicates and/or entities) at a certain hop level, $\cup$ is a union operation, and $\cap$ is an intersection operation.

In another implementation, the aggregation strategy may include a strict aggregation strategy, wherein AS_strict=

$\cap_i$ N-hood(Example$_i$ N)$\cap$N-hood(Target Triple).

In another implementation, step 150 may include determining an aggregation strategy and elements of neighborhood exactly to overlap based on context.

In another implementation, each triple yielded as an example may be used to create a prototype. For a given hop level (for example, N-hop), for each example, N-hop neighborhood from the original knowledge graph may be selected.

An edge weight for each edge of the prototype graph may be calculated based on the knowledge graph. In one implementation, the edge weigh may be calculated according to a maximum number of common overlap between neighborhoods. For example, a weight of edge may be equal to the number of the edge appears in the list of neighborhood graphs for examples.

In another implementation, once neighborhoods for examples are collected, the maximum common overlap between neighborhoods may be determined by taking a union operation between nodes and edges of each example's neighborhood and then taking an intersection operation between the output and target triple neighborhood.

Figure 6D:
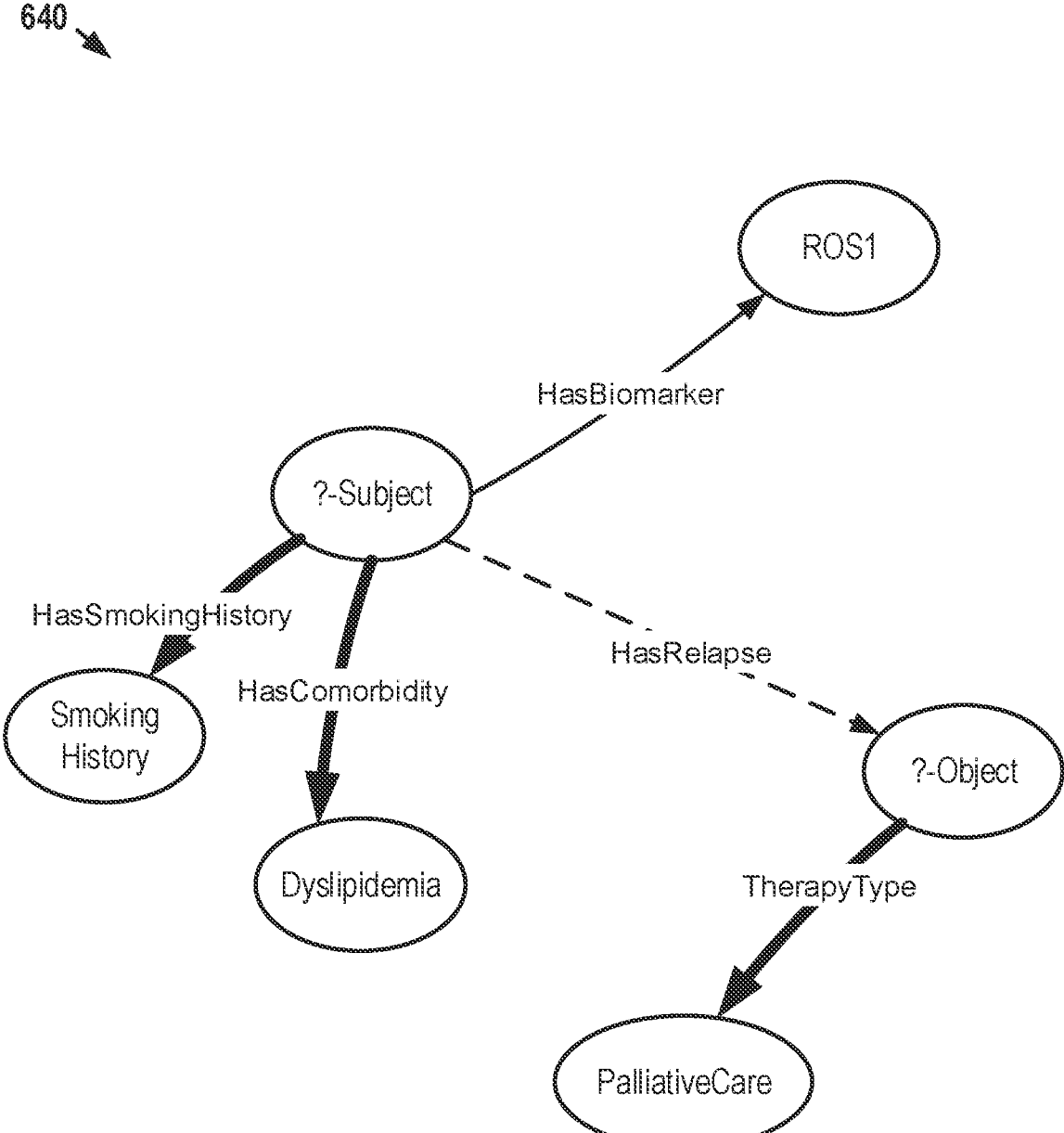
FIG. 6D shows another portion of an example illustrating permissive aggregation strategy with weight calculation in various embodiments.

FIGS. 6A-6D show an example with permissive aggregation strategy with weight calculation. FIG. 6A shows a first example 610 with 1-hop neighborhood. FIG. 6B shows a second example 620 with 1-hop neighborhood. FIG. 6C shows a target triple 630 with 1-hop neighborhood. Here 1-hop neighborhood may refer to that all nodes are in one link distance from target triple node.

A union operation may be performed on the first example 610 and the second example 620 to obtain a result. An intersection operation may be performed on the result and the target triple 630 to obtain a prototype result of permissive aggregation strategy. FIG. 6D shows the prototype 640 as a result of permissive aggregation strategy.

In one implementation, a thickness of a line representing a link in FIG. 6D may indicate a weight. For example, a thicker line for the link indicates a larger weight. The link "HasSmokingHistory" from "?-Subject" to "Smoking History" may have a larger weight than the link "HasBiomarker" from "?-Subject" to "ROS1".

For the present example in FIG. 6D, the prototype graph based on a permissive aggregation strategy with a weight calculation may include a portion or all of the following: <?-Subject, hasBiomarker, ROS1, 1>, <?-Subject, HasComorbidity, Dyslipidemia, 2>, <?-Subject, hasSmokingHistory, SmokingHistory, 2>, and <?-Object, therapyType, PalliativeCare, 2>. Here, the number in the notation corresponds to the weight value for each triple/link.

In another implementation, the step 150 may aggregate examples' neighborhoods to provide sparse set of features, including links and/or entities, common across all examples, unlike what is done in some of the previous works that do not provide prototypes as a part of explanations.

Referring to step 160 in FIG. 1, the method 100 may include generating, by a synthesis circuitry, an explanation graph based on the prototype graph, the set of example triples, and the target triple. The synthesis circuitry may include a portion or all of the execution circuitry 200 in FIG. 2, including a memory storing instructions and a processor in communication with the memory.

In one implementation, the synthesis circuitry may refer to an explanation graph assembler 538 in FIG. 5.

The synthesis circuitry may receive a set of example triples, a target triple, and a prototype graph as inputs, and generate/output an explanation graph.

Figure 7:
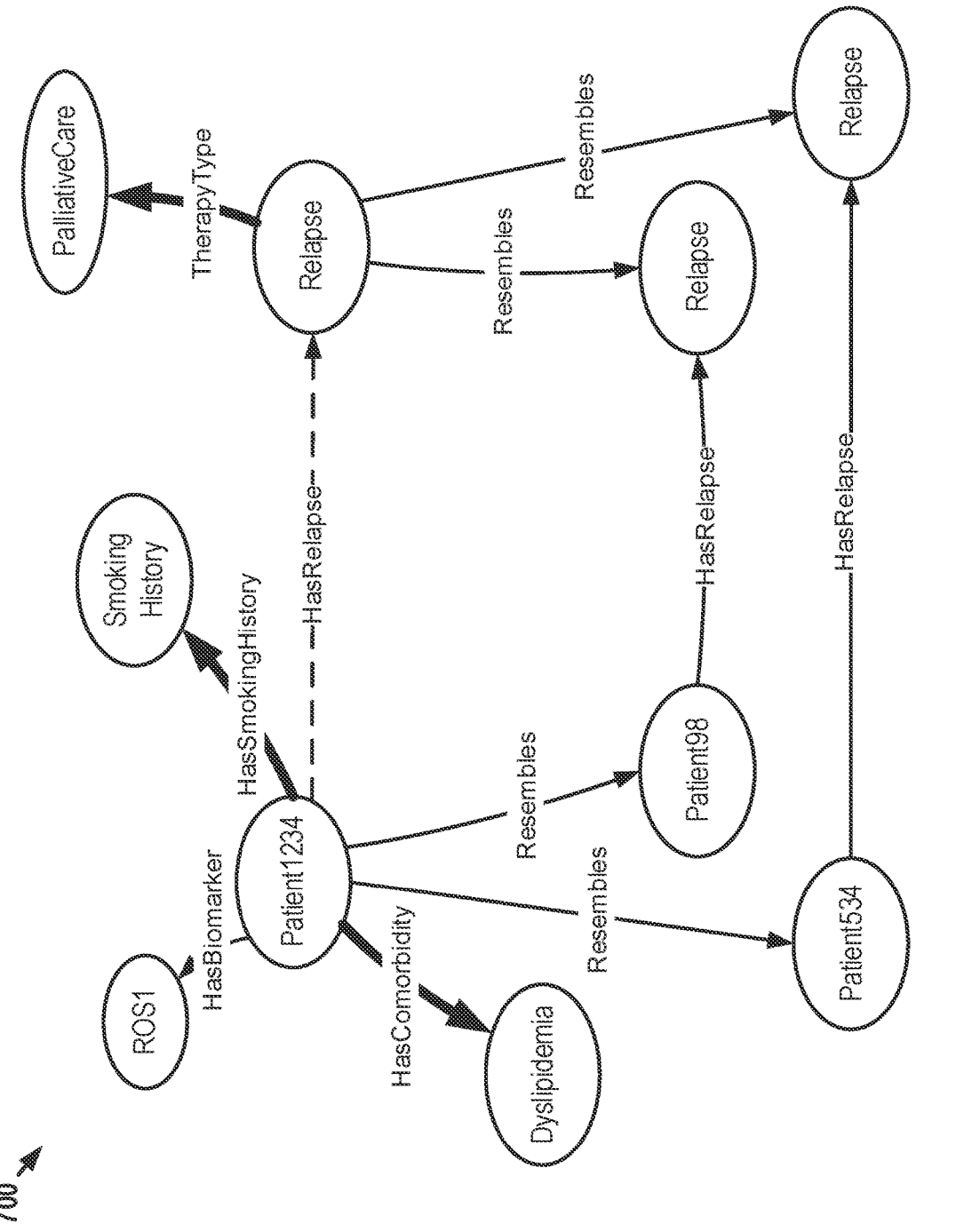
FIG. 7 shows an example illustrating an explanation graph in various embodiments.

The step 160 may combine the examples, the prototype graph, and the target triple in a new knowledge graph, which may refer as an explanation graph. In the explanation graph, examples are connected to the target triple with resemblance relations. FIG. 7 shows an example of an explanation graph 700, wherein the dashed line of the link "HasRelapse" from "Patient1234" to "Relapse" indicates a relation type to predict. In FIG. 7, a thickness of a line representing a link may indicate a weight for the link, and a thicker line indicates a larger weight.

In another implementation, the step 160 may assemble/synthesize examples, prototype graph, and target triple into an explanation graph which provides novel concise representation of explanation-by-example for link prediction system on knowledge graphs.

Referring to step 170 in FIG. 1, the method 100 may include generating, by an output circuitry, an explanation for the plausibility prediction based on the explanation graph. The output circuitry may include a portion or all of the execution circuitry 200 in FIG. 2, including a memory storing instructions and a processor in communication with the memory.

In one implementation, the output circuitry may output a concise explanation in a text format based on the explanation graph, so that the explanation graph and/or the explanation in the text format may be output and displayed to a user.

The present disclosure describes various embodiments including a KGE-based explanation subsystem that provides explanations through a novel heuristics consisting of a portion or all of the following components: sampling that may reduce a size of the knowledge graph, filtering that may generate pertinent examples, aggregating that may extract concise, sparse set of features as a prototype, and assembling results for outputting a novel concise explanation consisting of one or more examples, a prototype graph, and a target triple. The various embodiments in the present disclosure may be applied at the inference time, reducing the memory footprint from collecting extra training traces.

In the present disclosure, in some or all embodiments, a knowledge graph may refer to a set of entities and relations (or links) between these entities represented as a graph; a knowledge graph embedding may refer to an optimized set of vectors representing entities and links of a knowledge graph; a link prediction task may refer to a task for predicting plausibility of the missing link in the knowledge graph; a target triple may refer to a statement or fact that is subject to be evaluated for plausibility; a training step may refer to a step when a link prediction sub-system is optimized to source data, for example, the knowledge graph; and/or an inference/production step may refer to a step when an optimized link prediction system is used to predict plausibility of a single or a group of previously not seen links, which may be usually after training is finished.

While the present disclosure has been particularly shown and described with reference to an embodiment thereof, it will be understood by those skilled in the art that various changes in form and details may be made therein without departing from the spirit and scope of the present disclosure. Although some of the drawings illustrate a number of operations in a particular order, operations that are not order-dependent may be reordered and other operations may be combined or broken out. While some reordering or other groupings are specifically mentioned, others will be apparent to those of ordinary skill in the art and so do not present an exhaustive list of alternatives.

What is claimed is:

1. A computing device for generating an explanation for a prediction with respect to relapse of cancer in a patient based on a knowledge graph, the computing device comprising:

a reception circuitry configured to receive a target triple and the knowledge graph including a set of structured data, wherein the target triple includes a plurality of nodes and a plurality of links, wherein the plurality of nodes includes a subject of the target triple and an object of the target triple, wherein a first node of the plurality of nodes represents the patient who needs the prediction on whether the cancer in the patient will relapse, wherein a second node of the plurality of nodes represents the object indicating the relapse, and wherein a link of the plurality of links represent a relationship between the first node and the second node regarding relapse of the cancer in the patient;

a knowledge graph embedding circuitry configured to convert the knowledge graph to an embeddings space to output a plausibility prediction on whether the cancer in the patient will relapse for the target triple, wherein the embeddings space includes a set of point coordinates representing the set of structured data in the embeddings space, wherein the knowledge graph embedding circuitry comprises a neural network that generates embedding vectors as the set of point coordinates based on an optimizer, a scoring function, and a loss function;

a selection circuitry configured to sample, at an inference step after training of the neural network, a set of neighbors of elements of the target triple in the embeddings space;

a filter circuitry configured to generate a set of example triples based on the set of neighbors according to the target triple by:

generating a plurality of example candidates as cartesian product of the set of neighbors of the elements of the target triple, wherein the plurality of example candidates includes at least combinations of the subject of the target triple with objects of neighbors of the object of the target triple and subjects of neighbors of the subject of the target triple with the object of the target triple; and selecting, based on the set of example candidates that are considered as true according to the knowledge graph, a set of example candidates from the plurality of example candidates as the set of example triples;

an aggregation circuitry configured to generate a prototype graph based on the set of example triples according to the target triple;

a synthesis circuitry configured to generate an explanation graph based on the prototype graph, the set of example triples, and the target triple; and an output circuitry configured to output the explanation for the plausibility prediction, on a user interface for display of the prediction of the relapse of the cancer in the patient, based on the explanation graph.

2. The computing device according to claim 1, wherein, the selection circuitry is further configured to sample the set of neighbors based on the target triple in the embeddings space according to a similarity function.

3. The computing device according to claim 2, wherein the selection circuitry is further configured to perform:

determining whether a similarity between an embedding entity and an element of the target triple is equal to or larger than a similarity threshold; and in response to determining that the similarity between the embedding entity and the element of the target triple is equal to or larger than the similarity threshold, including the embedding entity as part of the set of neighbors.

4. The computing device according to claim 2, wherein the similarity function comprises an inverse of at least one of a cosine function, a Euclidean function, a Jaccard function, or a kernel-based function.

5. The computing device according to claim 1, wherein the aggregation circuitry is further configured to perform:

obtaining the prototype graph based on the set of example triples according to the target triple and at least one of a permissive aggregation strategy or a strict aggregation strategy.

6. The computing device according to claim 1, wherein: the aggregation circuitry is further configured to calculate an edge weight for each edge of the prototype graph based on the knowledge graph.

7. A method for generating an explanation for a prediction based on a knowledge graph with respect to relapse of cancer in a patient, the method comprising:

receiving, by a reception circuitry, a target triple and the knowledge graph including a set of structured data, wherein the target triple includes a plurality of nodes and a plurality of links, wherein the plurality of nodes includes a subject of the target triple and an object of the target triple, wherein a first node of the plurality of nodes represents the patient who needs the prediction on whether the cancer in the patient will relapse, wherein a second node of the plurality of nodes represents the object indicating the relapse, and wherein a link of the plurality of links represent a relationship between the first node and the second node regarding relapse of the cancer in the patient;

converting, by a knowledge graph embedding circuitry, the knowledge graph to an embeddings space to output a plausibility prediction on whether the cancer in the patient will relapse for the target triple, wherein the embeddings space includes a set of point coordinates representing the set of structured data in the embeddings space, wherein the knowledge graph embedding circuitry comprises a neural network that generates embedding vectors as the set of point coordinates based on an optimizer, a scoring function, and a loss function;

sampling, by a selection circuitry, at an inference step after training of the neural network, a set of neighbors of elements of the target triple in the embeddings space;

generating, by a filter circuitry, a set of example triples based on the set of neighbors according to the target triple by:

generating a plurality of example candidates as cartesian product of the set of neighbors of the elements of the target triple, wherein the plurality of example candidates includes at least combinations of the subject of the target triple with objects of neighbors of the object of the target triple and subjects of neighbors of the subject of the target triple with the object of the target triple; and selecting a set of example candidates from the plurality of example candidates as the set of example triples, based on the set of example candidates are considered as true according to the knowledge graph;

generating, by an aggregation circuitry, a prototype graph based on the set of example triples according to the target triple;

generating, by a synthesis circuitry, an explanation graph based on the prototype graph, the set of example triples, and the target triple; and outputting, by an output circuitry, the explanation for the plausibility prediction on a user interface for display of the prediction of the relapse of the cancer in the patient, based on the explanation graph.

8. The method according to claim 7, wherein sampling the set of neighbors of the elements of the target triple in the embeddings space comprises:

sampling the set of neighbors based on the target triple in the embeddings space according to a similarity function.

9. The method according to claim 8, wherein sampling the set of neighbors of the elements of the target triple in the embeddings space according to the similarity function comprises:

determining whether a similarity between an embedding entity and an element of the target triple is equal to or larger than a similarity threshold; and in response to determining that the similarity between the embedding entity and the element of the target triple is equal to or larger than the similarity threshold, including the embedding entity as part of the set of neighbors.

10. The method according to claim 8, wherein the similarity function comprises an inverse of at least one of a cosine function, a Euclidean function, a Jaccard function, or a kernel-based function.

11. The method according to claim 7, wherein the obtaining the prototype graph based on the set of example triples according to the target triple comprises:

obtaining the prototype graph based on the set of example triples according to the target triple and at least one of a permissive aggregation strategy or a strict aggregation strategy.

12. The method according to claim 7, further comprising:

calculating, by the aggregation circuitry, an edge weight for each edge of the prototype graph based on the knowledge graph.

13. A non-transitory computer-readable storage medium storing computer-readable instructions, wherein, the computer-readable instructions for generating an explanation for a prediction with respect to relapse of cancer in a patient based on a knowledge graph, when executed by a processor, are configured to cause the processor to perform:

receiving a target triple and the knowledge graph including a set of structured data, wherein the target triple includes a plurality of nodes and a plurality of links, wherein the plurality of nodes includes a subject of the target triple and an object of the target triple, wherein a first node of the plurality of nodes represents the patient who needs the prediction on whether the cancer in the patient will relapse, wherein a second node of the plurality of nodes represents the object indicating the relapse, and wherein a link of the plurality of links represent a relationship between the first node and the second node regarding relapse of the cancer in the patient;

converting the knowledge graph to an embeddings space to output a plausibility prediction on whether the cancer in the patient will relapse for the target triple, wherein the embeddings space includes a set of point coordinates representing the set of structured data in the embeddings space, wherein the knowledge graph is converted to the embeddings space by a neural network that generates embedding vectors as the set of point coordinates based on an optimizer, a scoring function, and a loss function;

sampling, at an inference step after training of the neural network, a set of neighbors of elements of the target triple in the embeddings space;

generating a set of example triples based on the set of neighbors according to the target triple by:

generating a plurality of example candidates as cartesian product of the set of neighbors of the elements of the target triple, wherein the plurality of example candidates includes at least combinations of the subject of the target triple with objects of neighbors of the object of the target triple and subjects of neighbors of the subject of the target triple with the object of the target triple; and selecting a set of example candidates from the plurality of example candidates as the set of example triples, based on the set of example candidates are considered as true according to the knowledge graph;

generating a prototype graph based on the set of example triples according to the target triple;

generating an explanation graph based on the prototype graph, the set of example triples, and the target triple; and outputting the explanation for the plausibility prediction, on a user interface for display of the prediction of the relapse of the cancer in the patient, based on the explanation graph.

14. The non-transitory computer-readable storage medium according to claim 13, wherein, the computer-readable instructions are further configured to cause the processor to perform:

sampling the set of neighbors based on the target triple in the embeddings space according to a similarity function.

15. The non-transitory computer-readable storage medium according to claim 14, wherein, the computer-readable instructions are further configured to cause the processor to perform:

determining whether a similarity between an embedding entity and an element of the target triple is equal to or larger than a similarity threshold; and in response to determining that the similarity between the embedding entity and the element of the target triple is equal to or larger than the similarity threshold, including the embedding entity as part of the set of neighbors.

16. The non-transitory computer-readable storage medium according to claim 14, wherein the similarity function comprises an inverse of at least one of a cosine function, a Euclidean function, a Jaccard function, or a kernel-based function.

17. The non-transitory computer-readable storage medium according to claim 13, wherein-the computer-readable instructions are further configured to cause the processor to perform:

obtaining the prototype graph based on the set of example triples according to the target triple and at least one of a permissive aggregation strategy or a strict aggregation strategy.

\* \* \* \* \*